United States Patent
Wang

(10) Patent No.: US 7,948,529 B2
(45) Date of Patent: May 24, 2011

(54) BLACK CARD CONTROLLING METHOD AND ELECTRONIC DEVICE THEREOF

(75) Inventor: Hung-Yu Wang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 769 days.

(21) Appl. No.: 12/031,759

(22) Filed: Feb. 15, 2008

(65) Prior Publication Data

US 2009/0102932 A1   Apr. 23, 2009

(30) Foreign Application Priority Data

Oct. 17, 2007   (TW) ................ 96138945 A

(51) Int. Cl.
*H04N 5/235*   (2006.01)

(52) U.S. Cl. ................ 348/229.1; 348/223.1; 348/225.1

(58) Field of Classification Search .............. 359/227, 359/230, 889
See application file for complete search history.

(56) References Cited

U.S. PATENT DOCUMENTS

2005/0083431 A1* 4/2005 Tsutsumi .............. 348/360
2006/0038901 A1* 2/2006 Tapes .................. 348/254

OTHER PUBLICATIONS

Wu, Hanjie. Black Card Photography (Part I), Oct. 21, 2009. Retrieved Mar. 9, 2011. URL: http://hanjies.blogspot.com/2009/10/black-card-photography-part-i.html.*

* cited by examiner

*Primary Examiner* — Nicholas G Giles
*Assistant Examiner* — Dwight Alex C Tejano
(74) *Attorney, Agent, or Firm* — Alan Kamrath; Kamrath & Associates PA

(57) ABSTRACT

A black card controlling method and an electronic device thereof are disclosed. The black card controlling method comprises the steps of: providing an electronic device used for photographing, wherein the electronic device comprises a photosensitive element, a shutter, a lens module and a black card device; obtaining an image by the photosensitive element; obtaining light contrast information by analyzing the image; moving the black card device and setting a shaking parameter of the black card device according to the light contrast information; starting the shutter; and shaking the black device according to the shaking parameter of the black card device.

17 Claims, 3 Drawing Sheets

BLACK CARD CONTROLLING METHOD AND ELECTRONIC DEVICE THEREOF

BACKGROUND OF THE INVENTION

1. Field of the Invention

The present invention relates to a black card controlling method and an electronic device thereof, and, more particularly, to a black card controlling method and electronic device thereof utilizing a processing module of an electronic device to reduce strong light contrast effect.

2. Description of the Related Art

With digital cameras getting more and more popular, people like to take photos more and more often. Normally in order to take good photos, the targeted object needs to face the light to obtain full exposure photos. However, when the targeted object is in the strong light, a strong light contrast effect might happen; and if the exposure time is too short, the object with low light will not be completely exposed; but if the exposure time is too long, the object with high light will be over exposed. In prior art technology, in order to solve the strong light contrast effect for the image capturing process, a method of shaking a black card manually during the image capturing process is developed. In this method, a black card is held in front of the camera lens to cover the bright portion and is quickly shaken to reduce the exposure time for the bright portion, therefore, the obtain photo can have even exposure. However, the manual shaking black card method is not easy to control, such as too short or too long shaking time, incorrect covering position or inconsistent shaking speed, which might cause under exposure or over exposure.

It is therefore desirable to provide a black card controlling method and an electronic device thereof to mitigate and/or obviate the aforementioned problems.

SUMMARY OF THE INVENTION

A main objective of the present invention is to provide a black card controlling method and an electronic device thereof for performing an image capturing process for an object with strong light contrast.

Another objective of the present invention is to provide an electronic device thereof utilizing the black card controlling method.

In order to achieve the above-mentioned objective a black card controlling method is disclosed. The black card controlling method comprises the steps of: providing an electronic device used for capturing images, wherein the electronic device comprises a photosensitive element, a shutter, a lens module and a black card device; obtaining an image information by the photosensitive element; obtaining light contrast information by analyzing the image information; moving the black card device and setting a shaking parameter of the black card device according to the light contrast information; starting the shutter; and shaking the black device according to the shaking parameter. Therefore, during the image capturing process for an object with strong light contrast, the electronic device can move the black card device to an appropriate position and shake the black card device to reduce uneven exposure.

In order to achieve another above-mentioned objective, the electronic device comprises a black card device, an image capturing module, a processing module and a driving device. The image capturing module for obtaining image information comprises a photosensitive element, a shutter and a lens module. The processing module is electrically connected to the black card device and the image capturing module, and the processing module controls the movement of the black card device and sets the shaking parameter of the black card device by analyzing the image information. The driving device is connected to the black card device and is electrically connected to the processing module, and the driving device shakes the black card device according to the shaking parameter. With above mentioned design, a user can easily use the electronic device to perform an image capturing process for an object with strong light contrast.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
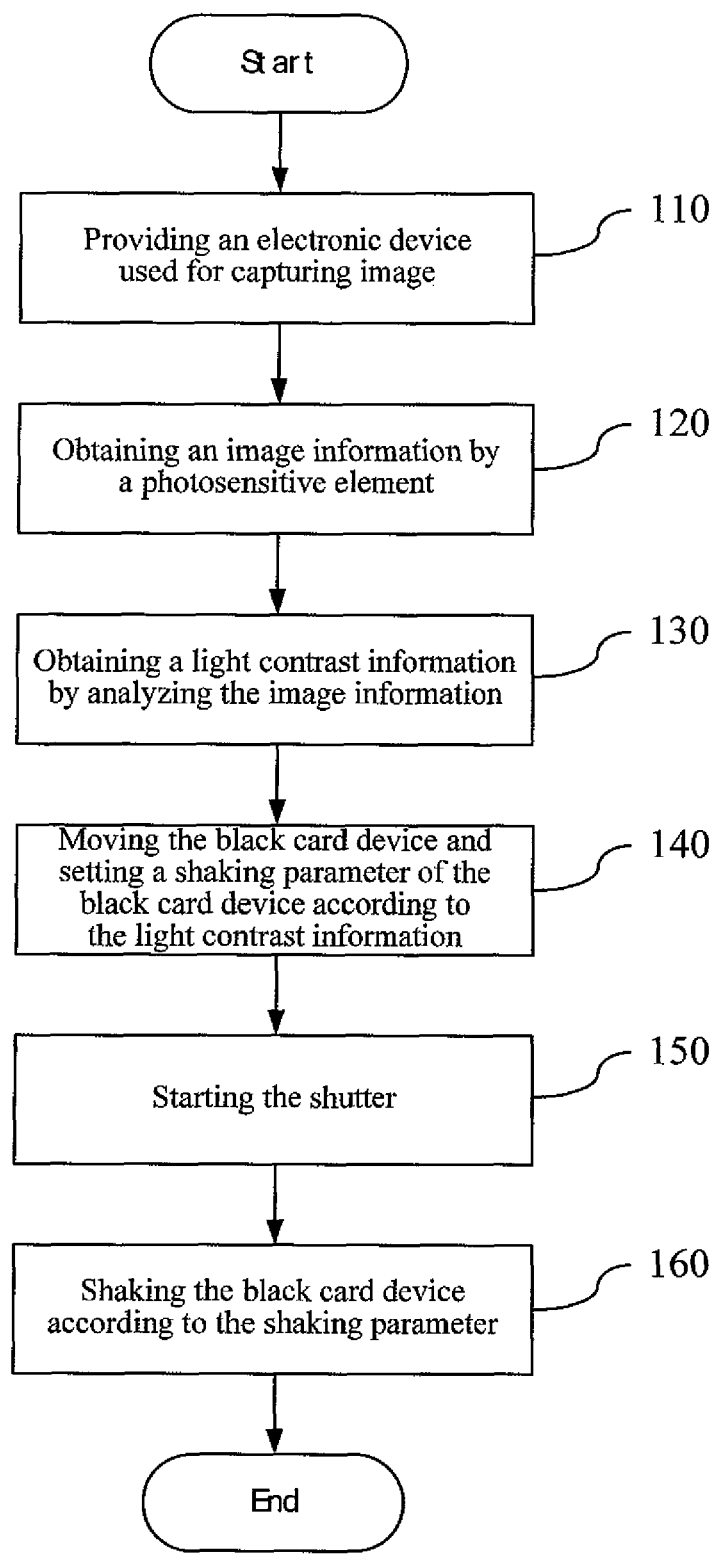
FIG. 1 is a flowchart of a black card controlling method of the present invention.
Figure 2:
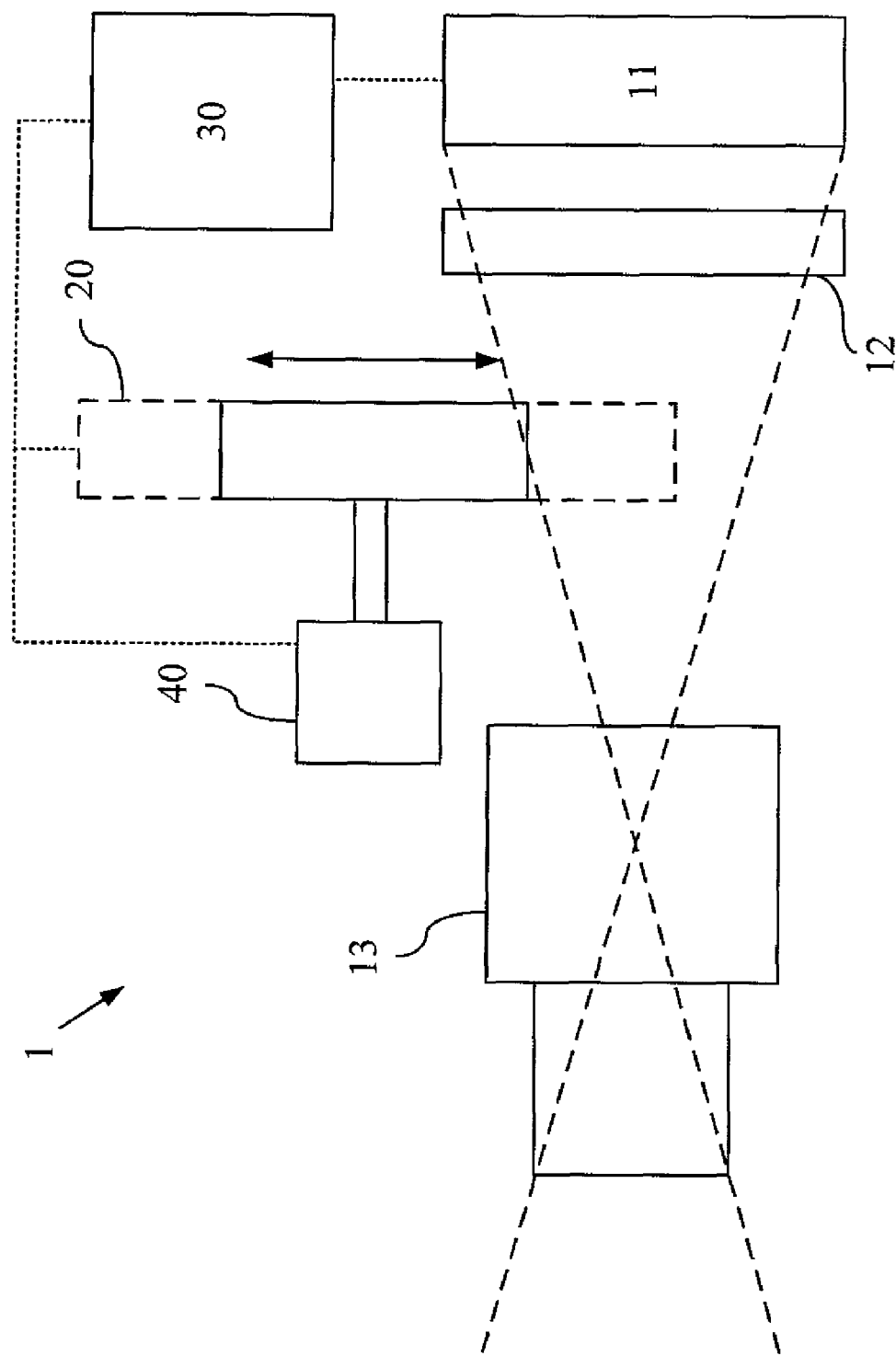
FIG. 2 is a schematic drawing of the black card controlling method of the present invention.

Please refer to FIG. 1 and FIG. 2. FIG. 1 is a flowchart of a black card controlling method of the present invention. FIG. 2 is a schematic drawing of the black card controlling method of the present invention.

As shown FIG. 1, a black card controlling method of the present invention comprises:

Step 110: providing an electronic device used for capturing images. As shown in FIG. 2, the electronic device 1 comprises a photosensitive element 11, a shutter 12, a lens module 13 and a black card device 20. In this embodiment, the black card device 20 is disposed between the photosensitive element 11 and the lens module 13 in the electronic device 1, but the black card device 20 may also be disposed in front of the lens module 13.

Step 120: obtaining an image information by the photosensitive element. As shown in FIG. 2, when the electronic device 1 is moved to aim a target object, the target object is focused and refracted by the lens module 13 and an image is formed on the photosensitive element 11, therefore, the image information of the target object may be obtained.

Step 130: analyzing the image information to obtain a light contrast information. After obtaining the image information of the target object, a processing module 30 of the electronic device 1 is used for analyzing the obtained the image information to obtain a light contrast information. The processing module 30 includes a software program for performing analysis to the image information. The light contrast information includes the light contrast location and the light contrast degree.

Step 140: moving the black card device according to the light contrast information and setting a shaking parameter of the black card device. After obtaining the light contrast information, the processing module 30 controls the black card device 20 according to the light contrast information. The processing module 30 of the electronic device 1 adjusts the position of the black card device 20 according to the light contrast location analyzed from the image information and adjusts the rotation direction and angle of the black card device 20 so the position of the black card device 20 is corresponding to the bright detail portion of the target object.

The processing module 30 may also adjust the shaking parameter of the black card device 20 according to the light contrast degree analyzed from the image information. The shaking parameter includes a shaking speed and a shaking time of the black card device 20. When the light contrast degree is higher, the shaking speed and the shaking time of the black card device 20 are increased to reduce over exposure; on the other hand, when the light contrast degree is lower, the shaking speed and the shaking time of the black card device 20 are reduced to increase take-in light amount for even exposure.

Step 150: starting the shutter. After placing the black card device 20 and setting the shaking parameter, the shutter 12 is activated to perform the image capturing process.

Step 160: shaking the black card device according to the shaking parameter. While the shutter 12 is activated, the processing module 30 enables a driving device 40 to shake the black card device 20 according to the preset shaking speed and the shaking time, and the image capturing process is performed after the shaking procedure is finished. In this embodiment, the driving device 40 is a motor, but it may also be other equivalent driving device.

With the previous steps, when the electronic device 1 is used for capturing images, it is not necessary to consider the light contrast condition around the target object, because the processing module 30 controls the black card device 20 to capture photo with ideal exposure value.

Figure 3:
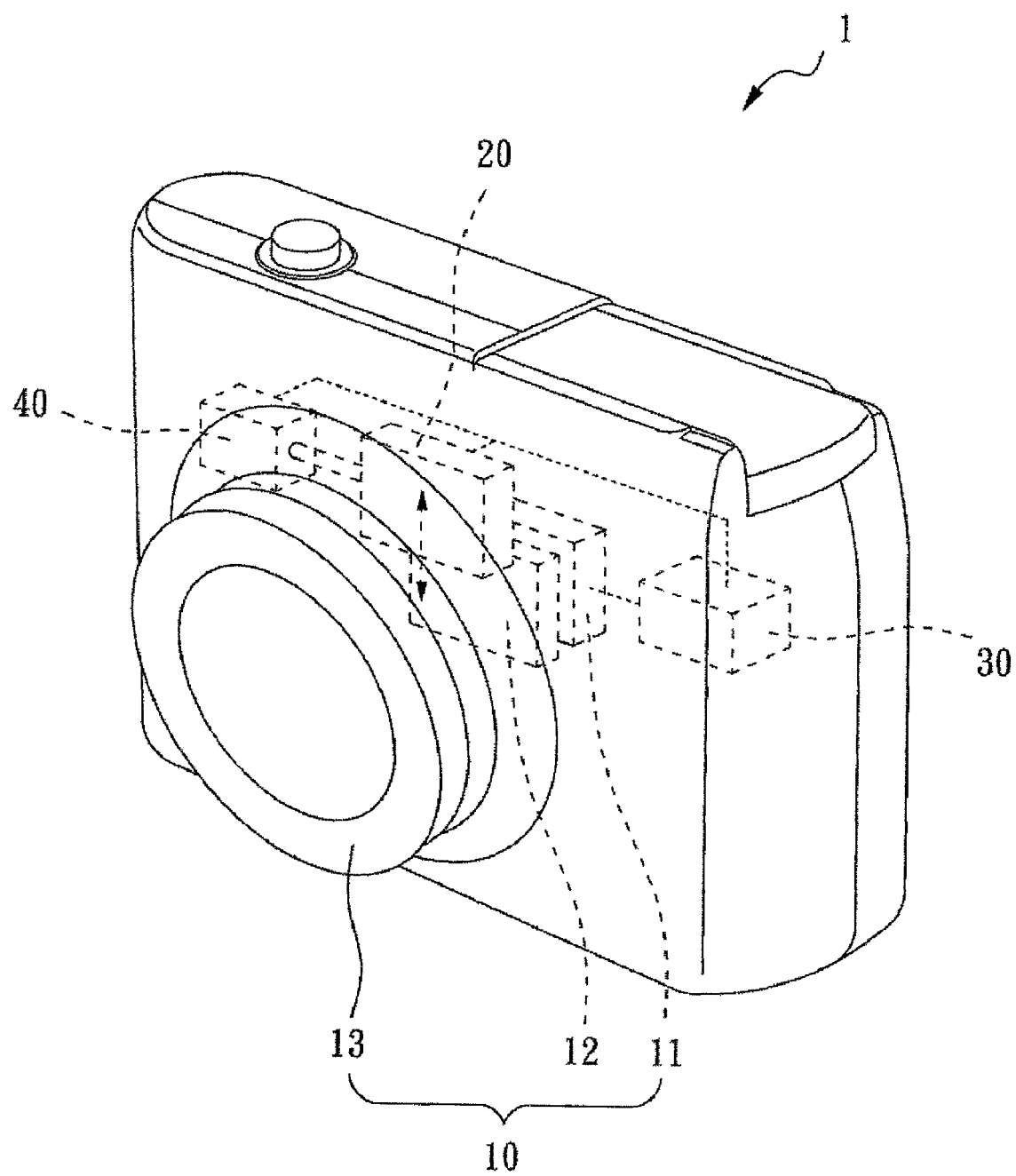
FIG. 3 is a schematic drawing of an electronic device performing black card controlling method of the present invention.

Please refer to FIG. 3. FIG. 3 is a schematic drawing of an electronic device performing black card controlling method of the present invention. As shown in FIG. 3, the electronic device 1 comprises a black card device 20, an image capturing module 10, a processing module 30 and a driving device 40. The image capturing module 10 for obtaining an image information comprises a photosensitive element 11, a shutter 12 and a lens module 13. The processing module 30 is electrically connected to the black card device 20 and the image capturing module 10. The processing module 30 controls the movement of the black card device 20 and sets the shaking parameter of the black card device 20 by analyzing the image information. The processing module 30 includes a software program, which is used for analyzing the image information. The driving device 40 is connected to the black card device 20 and is electrically connected to the processing module 30, and the driving device 40 shakes the black card device 20 according to the shaking parameter. In this embodiment, the electronic device 1 is a digital camera, but it may be any other electronic device used for capturing images.

The electronic device 1 of the present invention may utilize the previous method to control the black card device 20. Therefore, the black card device 20 is controlled by the processing module 30 to capture photo with ideal exposure value for an object with strong light contrast. Furthermore, when the electronic device 1 is rotated for different framing position (such as from horizontal direction rotated to vertical direction), the photosensitive element 11 receives different image information, and the light contrast information obtained from the processing module 30 is also different. Therefore, the black card device 20 is adjusted corresponding to the rotation of the electronic device 1. In this embodiment, a gear transmission mechanism is used for moving or rotating the black card device 20, but other equivalent structure may also be used. The black card device 20 is disposed between the photosensitive element 11 and the lens module 13 in the electronic device 1, to reduce the volume of the black card device 20 and simplify the external structure of the electronic device 1 so the electronic device 1 may be more portable. The black card device 20 may also be disposed in front of the lens module 13 to satisfy different designs for the electronic device 1.

Moreover, by changing the shutter value or aperture value of the electronic device 1, the shaking parameter of the black card device 20 may also be changed. Since the shutter value or aperture value are changed, the take-in light amount and exposure time projecting on the photosensitive element 11 are also changed, and the processing module 30 may adjust the shaking parameter according to the changed the shutter value or aperture value.

Although the present invention has been explained in relation to its preferred embodiment, it is to be understood that many other possible modifications and variations can be made without departing from the spirit and scope of the invention as hereinafter claimed.

What is claimed is:

1. A black card controlling method comprising:
    (a) providing an electronic device used for capturing images, the electronic device comprising a photosensitive element, a shutter, a lens module and a black card device;
    (b) obtaining an image information by the photosensitive element;
    (c) obtaining a light contrast information by analyzing the image information;
    (d) moving the black card device and setting a shaking parameter of the black card device according to the light contrast information;
    (e) starting the shutter; and
    (f) shaking the black card device according to the shaking parameter.

2. The method as claimed in claim 1, wherein in step (c) a processing module is utilized to analyze the image information to obtain the light contrast information.

3. The method as claimed in claim 1, wherein in step (d) the position of the black card device is adjusted according to the light contrast information.

4. The method as claimed in claim 3, wherein in step (d) the rotation direction and angle of the black card device is adjusted according to the light contrast information.

5. The method as claimed in claim 1, wherein the shaking parameter includes a shaking speed of the black card device.

6. The method as claimed in claim 5, wherein the shaking parameter includes a shaking time of the black card device.

7. The method as claimed in claim 1, wherein in step (f) a driving device is utilized to shake the black card device.

8. The method as claimed in claim 7, wherein the driving device is a motor.

9. An electronic device comprising:
    a black card device;
    a image capturing module, for obtaining an image information, the image capturing module comprising a photosensitive element, a shutter and a lens module;
    a processing module electrically connected to the black card device and the image capturing module, the processing module controlling the movement of the black card device by analyzing the image information and setting a shaking parameter of the black card device; and
    a driving device connected to the black card device and electrically connected to the processing module, the driving device shaking the black card device according to the shaking parameter.

10. The electronic device as claimed in claim 9, wherein the processing module is used for adjusting the position of the black card device.

11. The electronic device as claimed in claim 10, wherein the processing module is also used for adjusting the rotation direction and angle of the black card device.

12. The electronic device as claimed in claim 9, wherein the shaking parameter includes a shaking speed of the black card device.

13. The electronic device as claimed in claim 12, wherein the shaking parameter includes a shaking time of the black card device.

14. The electronic device as claimed in claim 9, wherein the driving device is a motor.

15. The electronic device as claimed in claim 9, wherein the black card device is disposed between the photosensitive element and the lens module.

16. The electronic device as claimed in claim 9, wherein the black card device is disposed in front of the lens module.

17. The electronic device as claimed in claim 9, wherein the electronic device is a digital camera.

* * * * *